United States Patent [19]

Birchfield

[11] Patent Number: 4,679,349

[45] Date of Patent: Jul. 14, 1987

[54] FISH LINE SINKER

[76] Inventor: Conny Birchfield, 3509 NE. 53rd St., #30, Vancouver, Wash. 98661

[21] Appl. No.: 827,942

[22] Filed: Feb. 10, 1986

[51] Int. Cl.⁴ ............................................. A01K 95/00
[52] U.S. Cl. .................................................. 43/44.97
[58] Field of Search ................. 43/44.96, 44.89, 44.91, 43/44.9, 42.35, 44.97, 42.02

[56] References Cited

U.S. PATENT DOCUMENTS

| | | | |
|---|---|---|---|
| 1,182,822 | 5/1916 | Volk | 43/44.97 |
| 2,842,993 | 7/1958 | Thomas | 43/44.89 |
| 3,151,414 | 10/1964 | Hoerner | 43/44.97 |
| 3,205,608 | 9/1965 | Dickinson | 43/42.35 |
| 3,771,252 | 11/1973 | Odenwald | 43/44.97 |

FOREIGN PATENT DOCUMENTS 945761  4/1974  Canada ................................ 43/44.96

Primary Examiner—Nicholas P. Godici
Assistant Examiner—Karen Skillman
Attorney, Agent, or Firm—Robert L. Harrington

[57] ABSTRACT

A fish line sinker produced from a length of coiled metal spring. The coiled spring windings are contiguous and resiliently permit stretching and bending, i.e., the spring snaps back when released. The spring windings are tightly coiled and strongly resist crushing. Thus when wedged between rocks, a pulling action that tends to drive the spring deeper into the wedge (by the fisherman pulling on the line) is resisted by the noncrushable cross section. Bending and/or stretching does occur and upon release, the snap back action frees the sinker.

6 Claims, 7 Drawing Figures

FISH LINE SINKER

FIELD OF INVENTION

This invention relates to a weight attachment for fishing line, ie. a fish line sinker, and more particularly to a fish line sinker that can be advantageously used for bottom fishing in lakes, rivers and streams.

BACKGROUND OF INVENTION

For some types of fishing it is desirable to maneuver the hook and bait along the bottoms of lakes, rivers and streams. However, particularly if the water is fast moving, the hook can be drawn to the water surface because of its light weight. Thus it is common to provide a weight that is attached to the fishing line a couple of feet back from the hook. The weight sinks below the water surface and carries with it the fishing hook. The term commonly applied to this weight is fish line sinker.

The fish line sinker can have a further function as a weight for casting. Without a weight on the end of the line, the line cannot be easily cast. Thus the fish line sinker is preferably designed so that it is of a shape and size that will contribute to the casting function. Perhaps more appropriately stated, the casting function is considered when designing the fish line sinker.

A problem that occurs with the use of fish line sinkers is that the sinker can sink to the bottom of the stream or lake and get wedged between rocks and the like. When this happens, unless the fisherman is successful is freeing the sinker, the line has to be broken or cut. The bait, hook, sinker and length of fish line are lost, a very annoying experience.

THE PRESENT INVENTION

The present invention, in its preferred embodiment, provides a fishing line weight (fish line sinker) in the form of a tightly coiled and elongated spring. The spring is both "bendably" and "stretchable" resilient. The simple coiled spring may itself be of sufficient weight for the purpose of weighting the fish line, but it is tubular so that lead shot or the like can be added to increase that weight. Because of its elongated straight sided shape, it does not readily wedge between rocks or the like. More importantly, when it does become wedged, the fisherman can "play" the line and, depending on it's orientation the sinker will stretch and snap back, or bend and snap back (or more likely a combination thereof) and this "snapping back" action will invariably free the sinker from between whatever objects it is caught on.

The cylindrical elongated shape of the sinker provides the added feature of being aerodynamically ideal for casting.

The Prior Art

The closet known prior art is a sinker presently available on the market. It is also tubular and elongated but is made in the form of a light weight plastic or elastimeric sleeve. Weights have to be added to the sleeve as the sleeve material itself does not provide the necessary mass. It does stretch and bend but not readily in the section containing the weights and certainly not with the same effect as the coiled spring design of the present invention. Most importantly, the elastimeric material is deformable, i.e., it collapses in the lateral direction when subjected to forces, and does so automatically when stretched or bent. When trying to free such a sinker, i.e., "playing the fish line", it can easily happen that the collapsing of the tube will result in increasing the wedging action. Whatever "snapback" is generated is insufficient to free the tightly wedged sinker, resulting in the undesired loss of hook, line and sinker.

It is accordingly an object of the present invention to provide a fish line sinker that provides snapback without cross sectional collapsing, e.g., the preferred elongated, coiled, tubular spring as briefly described.

DETAILED DESCRIPTION AND DRAWINGS

The reader will acquire further appreciation of the invention from the following detailed description having reference to the accompanying drawings wherein.

Figure 1:
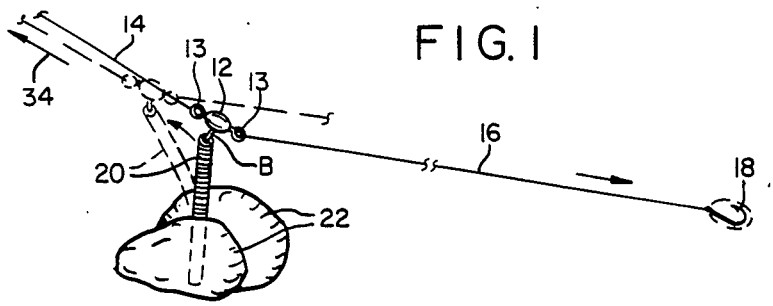
FIG. 1 illustrates a fish line sinker of the present invention, attached to a fish line and wedged between rocks at the botton of a lake or stream.

Referring to FIG. 1 of the drawings, a 3-Way coupler 12 having 3 coupling eyelets 13, joins the main fish line 14 from the fishing pole (not shown) to a line extension 16 having at its extended end, a fish hook 18. Depending from the third eyelet 13 is the fish line sinker 20.

In practice, hook 18 and sinker 20 are cast into the water and the sinker 20 sinks toward the bottom pulling the hook 18 with it. The fisherman then "plays" the hook either by reeling the hook in or through the action of the current. As the sinker bounces along the bottom, it is not uncommon that the sinker becomes wedged between rocks 22 as illustrated in FIG. 1.

Figure 2:
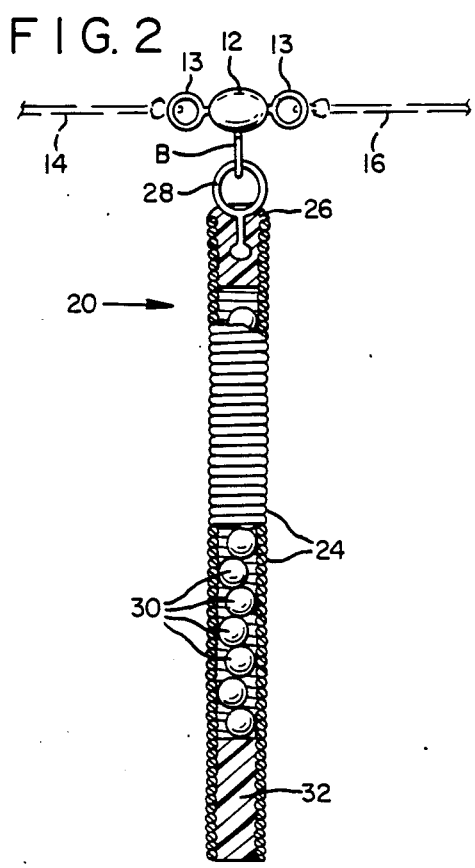
FIG. 2 is an enlarged view of the fish line sinker of FIG. 1, partially in cross section.
Figure 3:
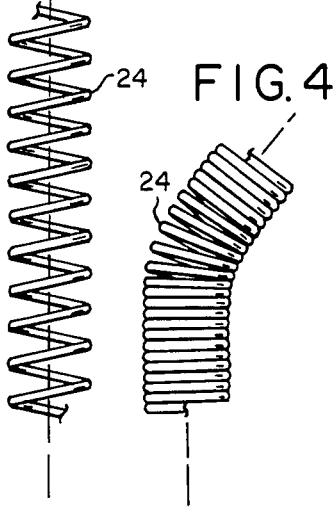
FIG. 3 illustrates the action of the fish line sinker of FIG. 1 when stretched.
Figure 4:
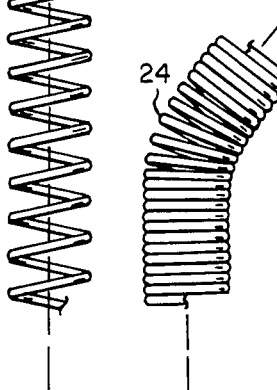
FIG. 4 illustrates the action of the fish line sinker of FIG. 1 when bent.

FIG. 2 is an enlarged view of the sinker 20. The basic structure includes a continuous spiral winding of steel wire 24. The wire has 0.05 inch diameter and is tightly wound in contiguous windings to form a 0.250 inch diameter cylindrical helix. The wire is heat treated in the helix form to retain that form but also giving it resilience, i.e., the helix can be stretched or elongated, forcing a separation of the windings as illustrated in FIG. 3, or bent over and thereby forcing a separation of the windings on the convex side of the bend as illustrated in FIG. 4. In either case the spring member is strongly urged to return to the shape of FIG. 2. Whereas the spring member can be readily produced from the description given, a satisfactory spring for this use is sold as window sash in most hardware stores. The spring need only be cut into the desired length and modified with the features which will now be described.

Referring further to FIG. 2, one end of the tubular shaped spring member is provided with a plug 26 and eyelet 28 that connects with an eyelet B of the coupler 12, thus providing means for attaching the spring member to the fishing line 14-16. As desired, the interior of the spring is provided with lead shot 30 to add weight, although as previously indicated, the steel spring is itself sufficiently heavy for many applications. The opposite end is provided with a second plug 32 to enclose the spring interior.

Figure 5:
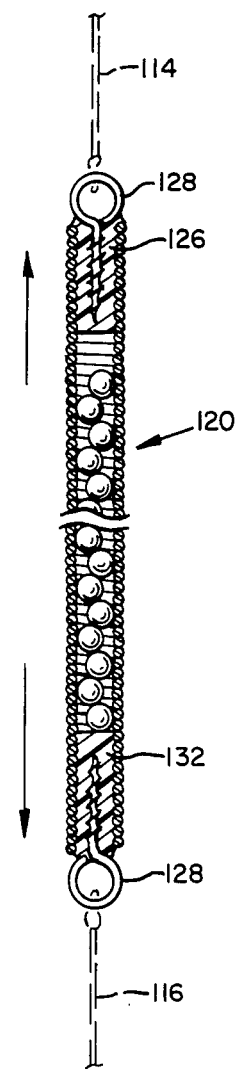
FIG. 5 illustrates an alternate use for the coil spring configuration of the invention.

FIG. 5 illustrates a variation of the sinker. In bottom fishing, it may not be desirable to weight the fish line to the very bottom of the river or stream and thus a sinker that hangs from the fish line such as illustrated in FIG. 1 is preferred. However, in deeper waters it may be desirable to simply induce sinking of the line to a controlled depth (controlled by the length of the line 14). In such a case a sinker 120 can be provided with plug ends 126 and 132, with both ends provided with eyelets 128. One eyelet is connected to line 114 and the other end to line 116. The interior again can be provided with lead shot for added weight as desired.

The benefit of this modified sinker is that it also functions as a shock absorber. Whereas the spring member is strong and resists being pulled apart, nevertheless, should a large fish strike the hook, the impact is partially absorbed by the resiliency of the spring. This reduces the shock to the fish line which is thus not as likely to break.

In Operaton

Reference is made to FIGS. 2 through 4. It will be appreciated that the sinker 20 is designed to hang down or depend from the fishing line and under various conditions, will be dragged along the river, stream or lake bottom. It is very common, particularly in fast moving streams that the bottom is largely made up of exposed rocks. It is thus not uncommon that a depending sinker will become oriented so as to be pulled into the crevice formed between adjacent rocks, to there become wedged and held fast as illustrated in solid lines in FIG. 1.

In such a position, the fisherman has very limited ability to move the sinker in an attempt to free it. Simply releasing the line does nothing as there needs to be a reverse force to drive the sinker in a direction reverse to that of arrow 34. With the present invention, the fisherman is able to generate the necessary reverse force by jerking the line taught, thereby bending and/or elongating the spring as illustrated in dotted line in FIG. 1, and quickly releasing the line to allow the spring like forces to snap back. This snap back action will invariably loosen the sinker.

It is considered important that the spring does not collapse laterally during the jerking motion generated by the fisherman. Note from FIGS. 3 and 4 that the spring is elongated and/or bent over without collapsing the spring. Such collapsing is greatly resisted and accordingly it does not become pinched and pulled tighter between the rocks.

Figure 6:
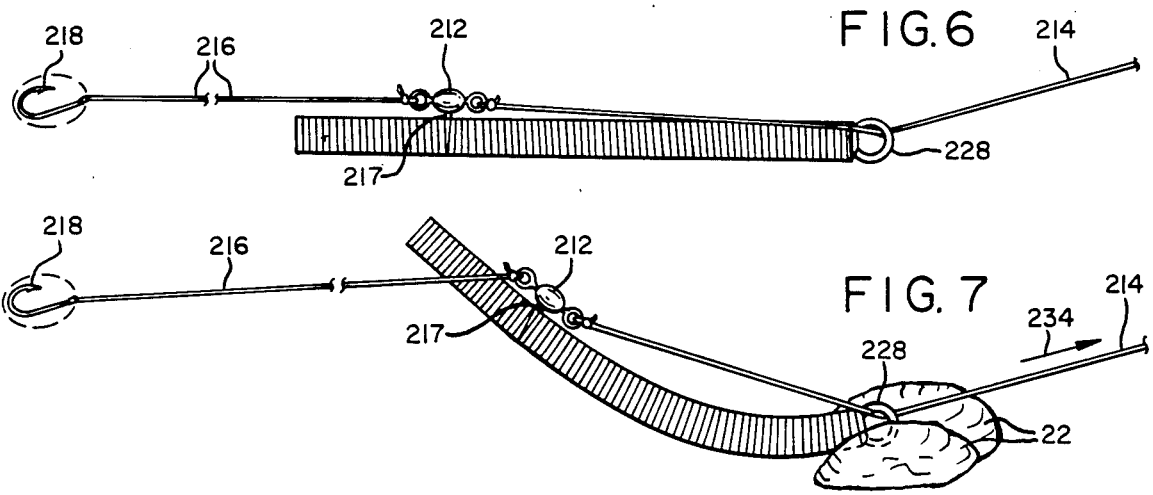
FIG. 6 illustrates a further aembodiment of the invention.
Figure 7:
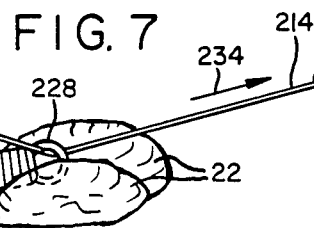
FIG. 7 illustrates the action of the sinker of FIG. 6 when wedged between rocks.

A further variation of the invention is illustrated in FIGS. 6 and 7. As illustrated, line 214 from the fishing pole passes through eyelet 228 and is tied to coupler 212 located about two thirds to three fourths the distance along the length of the sinker. The coupler 212 is anchored to the sinker at this point, i.e., point 217. Line 216 is also tied to coupler 12 and trails the fish hook 18.

FIG. 7 illustrates the sinker engaging a rock. In that the line 214 is free to slide through eyelet 228, pulling on line 214, i.e. arrow 234, will cause the sinker to bend as illustrated. Release of the line 214 will generate the snap back action to release the sinker.

Others having knowledge of the art will likely conceive of variations and modifications upon review of the above disclosure. Accordingly, it is to be understood that the above illustration is of a preferred embodiment only and the invention is encompassed by the claims appended hereto.

What is claimed is:

1. In combination a fish line, and sinker comprising; an elongated coil spring body member forming the outer configuration of the sinker having the properties of being resiliently bendable and resiliently stretchable whereby regardless of orientation, upon getting wedged between objects it can be resiliently deformed by a pulling action to generate a snap back reaction, said body member being laterally rigid and thereby crush resistent, and attachment means attaching the body member to said fish line.

2. The combination as defined in claim 1 wherein the elongated body member is tubular, and weight producing members sealed within the tubular interior.

3. The combination as defined in claim 1 wherein the body member is a tightly coiled metal spring whereby stretching and bending produces separation of the windings while maintaining a substantially rigid crush resistent cross section.

4. The combination as defined in claim 1 wherein the elongated body member is a length of steel wire having a diameter of about 0.05 inches coiled into contiguous windings and heat treated to form a tubular helix having a diameter no greater than about 0.250 inch, lead shot partially filling the interior, plugs at each end sealing the interior, and a fastener embedded in one of the end plugs for fastening the body member to a fish line.

5. The combination as defined in claim 4 wherein fasteners are provided in both end plugs for insertion of the body member as a spacer in a fish line for absorbing shock.

6. A fish line sinker connected to a fishing line comprising; an elongated body member composed of a contiguously coiled wire that is bendably and stretchably resilient, an eyelet at one end, attaching means for attaching a fish line to the body member located inwardly from either end and spaced from the eyelet, a fish line slideably inserted through the eyelet and connected by the attaching means to the body member whereby pulling of the fish line with the eyelet held in place will force bending of the body member in the portion thereof between the attaching means and eyelet.

* * * * *